(12) United States Patent
Lahiri et al.

(10) Patent No.: US 12,549,380 B2
(45) Date of Patent: Feb. 10, 2026

(54) SYSTEMS AND METHODS FOR IMPROVED SECURITY IN HYBRID INFRASTRUCTURE

(71) Applicant: Microsoft Technology Licensing, LLC, Redmond, WA (US)

(72) Inventors: Shayak Lahiri, Redmond, WA (US); Narasimhan Ramasubramanian, Redmond, WA (US); Pranav Kukreja, Seattle, WA (US); Prashant Dewan, Austin, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 76 days.

(21) Appl. No.: 18/673,950

(22) Filed: May 24, 2024

(65) Prior Publication Data
US 2025/0365159 A1    Nov. 27, 2025

(51) Int. Cl.
H04L 9/32 (2006.01)
(52) U.S. Cl.
CPC .......... *H04L 9/3247* (2013.01); *H04L 9/3234* (2013.01)
(58) Field of Classification Search
None
See application file for complete search history.

(56) References Cited

U.S. PATENT DOCUMENTS

| 7,050,549 | B2* | 5/2006 | Hannigan | H04M 3/2281 |
| | | | | 379/22 |
| 10,516,672 | B2* | 12/2019 | Gupta | H04L 63/102 |
| 10,673,617 | B1* | 6/2020 | Antoniou | G06F 13/4282 |
| 10,829,088 | B2* | 11/2020 | Jarvis | G07C 1/00 |
| 10,880,289 | B2* | 12/2020 | Jensen | H04L 63/0815 |
| 11,212,268 | B2* | 12/2021 | Madisetti | H04L 63/061 |
| 11,418,343 | B2* | 8/2022 | Elmenshawy | H04L 9/3213 |
| 11,856,111 | B2* | 12/2023 | Mohan | G07C 5/008 |
| 11,895,121 | B1* | 2/2024 | Karim | H04L 63/20 |
| 12,192,360 | B2* | 1/2025 | Kline | H04L 9/3213 |
| 12,411,928 | B2* | 9/2025 | Raghuram | G06F 21/64 |
| 2007/0203754 | A1* | 8/2007 | Harrington | G16H 40/67 |
| | | | | 705/3 |
| 2018/0227369 | A1* | 8/2018 | DuCray | G16H 40/20 |

(Continued)

OTHER PUBLICATIONS

"Azure Arc overview", Retrieved from the Internet: «https://learn.microsoft.com/en-US/azure/azure-arc/overview», Jun. 13, 2025, 5 Pages.

(Continued)

*Primary Examiner* — Backhean Tiv (57) ABSTRACT

Examples of the present disclosure describe systems and methods for improved security in hybrid infrastructure. A signing authority verifies its identity to an identity and access management (IAM) service and verify that it is running on a healthy node to the IAM service before the IAM service issues an intermediate signing certificate to the signing authority. A workload verifies its identity to the signing authority and verifies that the workload is running on a healthy node to the signing authority before the signing authority issues a token to the workload. Additionally, the signing authority binds the token to the edge infrastructure associated with the provider of the token request. Workloads, storage, or other cloud endpoints verify the identity of other workloads and verify the health of the node that the other workloads are running on before granting access.

20 Claims, 8 Drawing Sheets

(56) References Cited

U.S. PATENT DOCUMENTS

| | | | |
|---|---|---|---|
| 2020/0084202 A1* | 3/2020 | Smith | H04W 12/08 |
| 2022/0114249 A1* | 4/2022 | Grancharov | G06F 21/53 |
| 2024/0012933 A1 | 1/2024 | Widmer | |
| 2024/0022550 A1* | 1/2024 | Raghuram | H04L 63/062 |

OTHER PUBLICATIONS

"Azure Local solution overview", Retrieved from the Internet: «https://learn.microsoft.com/en-US/azure/azure-local/overview?view=azloc-2505», May 2, 2025, 6 Pages.

"Microsoft identity platform and the OAuth 2.0 client credentials flow", Retrieved from the Internet: «https://learn.microsoft.com/en-us/entra/identity-platform/v2-oauth2-client-creds-grant-flow», Jan. 4, 2025, 13 Pages.

"Trusted Platform Module Technology Overview", Retrieved from the Internet: «https://learn.microsoft.com/en-us/windows/security/hardware-security/tpm/trusted-platform-module-overview», Jul. 10, 2024, 4 Pages.

Baiardi, et al., "Measuring Semantic Integrity for Remote Attestation", International Conference on Trusted Computing, Apr. 6, 2009, pp. 81-100.

International Search Report and Written Opinion received for PCT Application No. PCT/US2025/018036, mailed on Jun. 12, 2025, 11 pages.

"The JWT SPIFFE Verifiable Identity Document" accessed on link https://github.com/spiffe/spiffe/blob/main/standards/JWT-SVID.md, Feb. 11, 2024, 7 pages.

"Authentication", accessed on link https://github.com/spiffe/spiffe/blob/main/standards/SPIFFE_Workload_Endpoint.md#5-authentication, Feb. 11, 2024, 3 pages.

"Fleet-enabled components", accessed on link https://cloud.google.com/anthos/fleet-management/docs/fleet-concepts#fleet-enabled-components, Google Cloud, Feb. 11, 2024, 8 pages.

"How it Works", accessed on link https://github.com/bloomberg/spire-tpm-plugin#how-it-works, Feb. 11, 2024, 2 pages.

"Microsoft Authentication Library (MSAL) for Go" accessed on link https://github.com/AzureAD/microsoft-authentication-library-for-go, Feb. 11, 2024, 4 pages.

SPIFFE Bundles, accessed on link https://github.com/spiffe/spiffe/blob/main/standards/SPIFFE_Trust_Domain_and_Bundle.md#3-spiffe-bundles, Feb. 11, 2024, 7 pages.

"The SPIFFE Identity and Verifiable Identity Document", accessed on link https://github.com/spiffe/spiffe/blob/main/standards/SPIFFE-ID.md, Feb. 11, 2024, 10 pages.

"The SPIFFE Workload API", accessed on link https://github.com/spiffe/spiffe/blob/main/standards/SPIFFE_Workload_API.md, Feb. 11, 2024, 15 pages.

"The X.509 SPIFFE Verifiable Identity Document", accessed on link https://github.com/spiffe/spiffe/blob/main/standards/X509-SVID.md, Feb. 11, 2024, 7 pages.

"Third case: Access token request with a federated credential" accessed on link https://learn.microsoft.com/en-us/entra/identity-platform/v2-oauth2-client-creds-grant-flow#third-case-access-token-request-with-a-federated-credential, Microsoft, Oct. 24, 2023, 4 pages.

"TPM Key Attestation", accessed on link https://learn.microsoft.com/en-us/windows-server/identity/ad-ds/manage/component-updates/tpm-key-attestation, Microsoft, May 17, 2023, 14 pages.

"Universal identity control plane for distributed systems", accessed on link https://spiffe.io/, Feb. 11, 2024, 6 pages.pdf.

"Using a KMS provider for data encryption", accessed on link https://kubernetes.io/docs/tasks/administer-cluster/kms-provider/, Kubernetes, 2024, 8 pages.

Feldman, et al., "Solving the Bottom Turtle", accessed on link https://spiffe.io/pdf/Solving-the-bottom-turtle-SPIFFE-SPIRE-Book.pdf, 2020, 194 pages.

* cited by examiner

SYSTEMS AND METHODS FOR IMPROVED SECURITY IN HYBRID INFRASTRUCTURE

BACKGROUND

Edge infrastructure is a distributed computing framework that brings applications closer to data sources. Edge infrastructure offers benefits such as reduced latency, improved bandwidth efficiency, enhanced privacy, and increased resilience compared to centralized cloud computing services. However, edge infrastructure, cloud computing environments, and/or other endpoints provide various attack surfaces that must be secured to ensure the security of data transmitted by and stored within edge infrastructure, cloud computing environments, and/or other endpoints.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

The present disclosure relates to systems and methods for improved security in hybrid infrastructure. An example system includes a signing authority running on a node that provides a shared secret signed by an attestation key to an identity and access management service running on a cloud platform. The attestation key indicates that an identity of the signing authority is verified. The signing authority provides attestation evidence to the identity and access management service. The attestation evidence indicates that the node that the signing authority is running on is healthy. The signing authority receives an intermediate signing certificate from the identity and access management service based on the shared secret and the attestation evidence.

Another example system includes a signing authority that receives a token request from a workload running on a node. The token request is signed by an attestation key. The attestation key indicates that an identity of the node is verified. The signing authority receives attestation evidence from the node indicating that the node is healthy. The signing authority binds a token to edge infrastructure associated with the workload based on the token request and the attestation evidence. The signing authority provides the token to the workload.

Another example system includes a first workload running on a node, a second workload running on the node, and a storage. The second workload or the storage receives a bound token and attestation evidence from the first workload. The bound token indicates that the identity of the first workload is verified, and the attestation evidence indicates that the node is healthy. The second workload or the storage grants the first workload access based on the identity of the first workload being verified and the node being healthy.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

In accordance with examples described herein, the present application provides systems and methods for improved security in hybrid infrastructure.

Edge infrastructure is a distributed computing framework that includes one or more devices (e.g., IoT devices, routers, cameras, sensors, local edge servers) and brings applications and services closer to the users and data sources that are served by the edge infrastructure. Edge infrastructure offers benefits to end users such as reduced latency, improved bandwidth efficiency, enhanced privacy, and increased resilience compared to cloud computing environments. However, edge infrastructure, cloud computing environments, and/or other endpoints ("hybrid infrastructure") provide various attack surfaces that must be secured to ensure the security of data transmitted by and stored within hybrid infrastructure. For example, in some hybrid infrastructure, the attack surfaces include the trust relationships established between various components of the hybrid infrastructure. For instance, a trust relationship is established between a signing authority of an edge environment and an access management service of a cloud computing environment that provides the edge environment, a trust relationship is established between the signing authority of the edge environment and a local identity management agent of a computing device within the edge environment, a trust relationship is established between a workload (executing on the computing device) and the signing authority of the edge environment, and/or a trust relationship is established between a workload (executing on the computing device) and the access management service of the cloud computing environment.

In some example attack scenarios, attackers use tokens to gain access to workloads, resources, or services of hybrid infrastructure (e.g., edge infrastructure or a cloud computing environment). For instance, edge infrastructure implements nodes (e.g., physical machines or virtual machines (VMs))

that execute workloads associated with a user. A workload is a task, process, service, or application accomplished or executed using computing resources. In examples, a workload uses tokens to access resources accessible to the edge infrastructure (e.g., other workloads or data stores in the node or the cloud computing environment). A token represents a security credential (e.g., a user credential or an account credential) that grants access to resources accessible to the edge infrastructure. In some examples, tokens are issued to workloads by a signing authority that runs on a node and enables managing identities (e.g., machine, virtual machine, or workload identities), granting access permissions, and verifying the authenticity of machines, virtual machines, or workloads. In one example attack scenario, an attacker attempts to clone or spoof the signing authority in order to issue spoofed tokens that are under the control of the attacker. The spoofed tokens are then used to gain access to resources accessible to the hybrid infrastructure. In another example attack scenario, an attacker attempts to intercept tokens that are issued to workloads from the signing authority in order to use the tokens to gain access to resources accessible to the hybrid infrastructure. In another example attack scenario, an attacker attempts to spoof a workload and use a token in order to gain access to other resources accessible to the hybrid infrastructure.

The present disclosure provides a solution to hybrid infrastructure attack scenarios, such as those described above. Embodiments of the present disclosure describe systems and methods for improving security in hybrid infrastructure using a signing authority that runs on a node of the edge infrastructure. In one example, the signing authority provides a shared secret signed by an attestation key to verify the identity of the signing authority and attestation evidence attesting that the node the signing authority is running on is healthy to an identity and access management (IAM) service running in a cloud computing environment, as described in FIG. 2. In another example, the signing authority receives, from a workload running on a node, a token request signed by an attestation key to verify the identity of the workload and attestation evidence of the node. The signing authority provides a token to the workload. The workload uses the token to gain access to resources accessible to the hybrid infrastructure, as described in FIG. 3. In yet another example, a first workload provides a bound token to verify the identity of the first workload and attestation evidence to verify the health of the node that the first workload is running on to a second workload or a storage to gain access to resources accessible to the hybrid infrastructure, as described in FIG. 4.

FIG. 1-4 illustrate various systems (i.e., systems 100-400) for implementing improved security in hybrid infrastructure. Systems 100-400, as presented, each include a combination of interdependent components that interact to form an integrated whole. Components of systems 100-400 include hardware components or software components (e.g., application programming interfaces (APIs), modules, runtime libraries) implemented on and/or executed by hardware components of systems 100-400. In some examples, components of systems 100-400 are distributed across multiple processing devices or computing systems.

Figure 1:
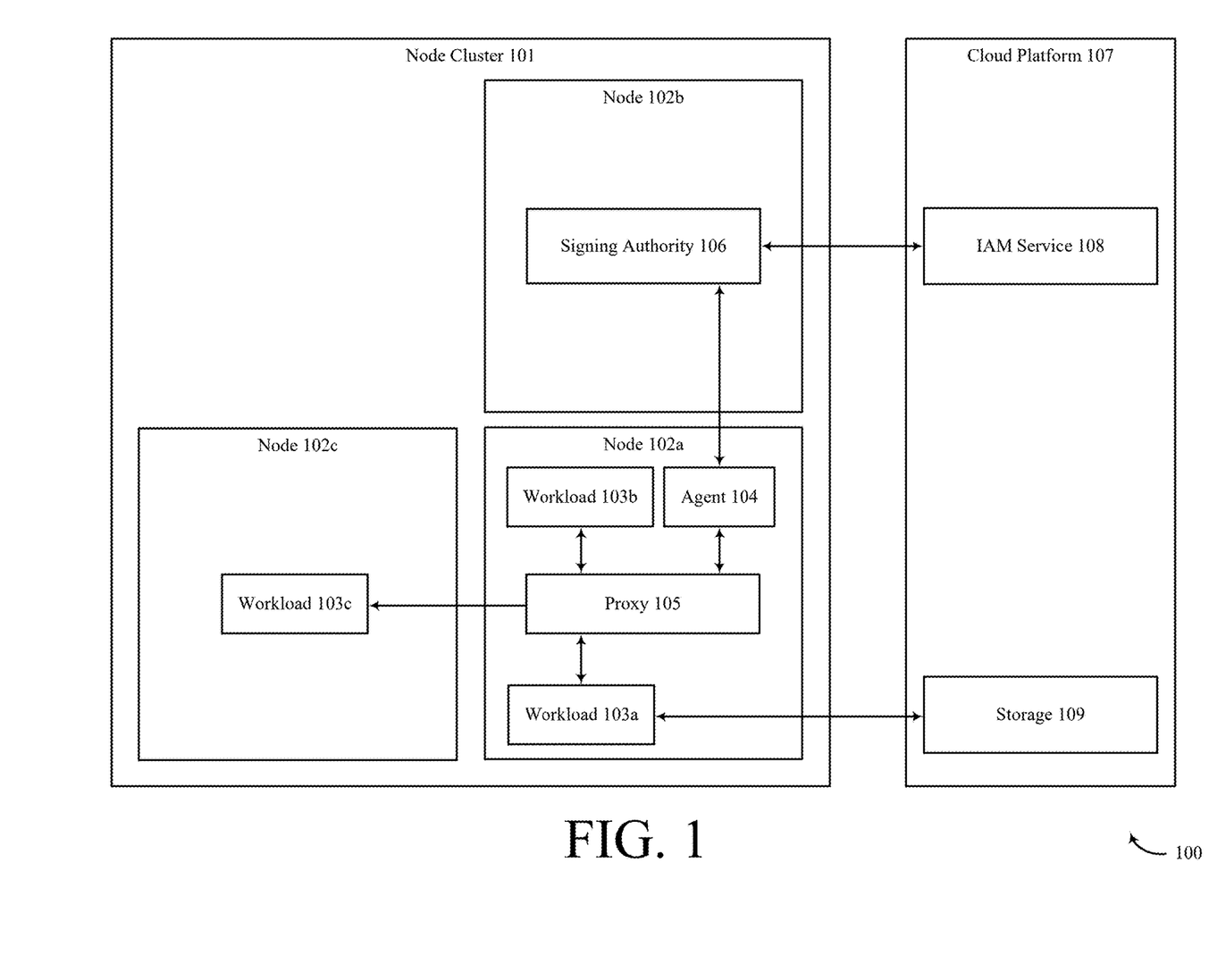
FIG. 1 illustrates an example system diagram that implements systems and methods for improved security in hybrid infrastructure in accordance with examples described herein.

FIG. 1 illustrates an example system 100 for improving security in hybrid infrastructure. System 100 includes node cluster 101, node 102a, node 102b, node 102c (collectively, nodes 102), workload 103a, workload 103b, workload 103c (collectively, workloads 103), agent 104, proxy 105, signing authority 106, cloud platform 107, IAM service 108, and storage 109. The scale and structure of devices and environments discussed herein vary and include additional or fewer components than those described in FIG. 1 and subsequent figures. For example, node cluster 101 includes additional or fewer nodes than illustrated and nodes 102 include additional or fewer workloads, agents, and/or proxies than illustrated.

Node cluster 101 is a set of one or more nodes 102. In some examples, node cluster 101 runs on edge infrastructure including one or more edge devices. Edge infrastructure is deployed near the users and data sources that are served by the edge infrastructure. Data sources are input devices that generate and/or collect data, such as keyboards, cameras, sensors, and the like. In examples, edge infrastructure includes one or more edge devices that have the computing power to process data (e.g., from the data sources). Edge devices are hardware that process data near the users and data sources that are served by the edge infrastructure, which allows for faster processing and response times due to reduced latency as compared to centralized cloud computing services. In some examples, edge devices include IoT devices, routers, servers, and the like.

Nodes 102 are physical machines or virtual environments, such as VMs. A physical machine is hardware on which software runs (e.g., a personal computer (PC), a server, or a mobile device). A VM is an emulation of a computing system that provides the functionality of a physical machine and is able to run software in a similar way as a physical machine. Nodes 102 run workloads 103 that are associated with one or more users or computing devices. In examples, nodes 102 or workloads 103 use tokens to access resources accessible to system 100, such as other workloads 103, data stores, computing devices, files, and/or compute resources (e.g., CPU, memory, storage). Node 102a includes agent 104, proxy 105, workload 103a, and workload 103b. Node 102b includes signing authority 106. Node 102c includes workload 103c.

Workloads 103 are tasks, processes, services, or applications accomplished or executed using resources accessible to system 100. In some examples, workloads 103 are organized into packages of files and executed in a containerized environment (e.g., within a container or VM). For instance, a containerized workload is a standalone executable package of software that includes the components for running workloads 103 (e.g., code, runtime, system tools, and system libraries). In examples, workloads 103 use tokens to authenticate workloads 103 and/or other components of system 100. For instance, workloads 103 provide tokens to other workloads 103, services, or data stores in order to facilitate access to resources accessible to system 100.

Agent 104 is a software service that enables secure communication between nodes 102. For example, agent 104 enables node 102a to securely communicate with signing authority 106. In some examples, agent 104 uses a transport layer security (TLS) protocol, which is a cryptographic protocol that enables secure communication by encrypting data communicated between nodes 102. In some examples, workload 103a provides a token request to agent 104 via proxy 105, and agent 104 provides the token request to signing authority 106. In response to the token request, signing authority 106 provides a token to agent 104, which provides the token to workload 103a via proxy 105.

Proxy 105 is a software service or physical device that is an intermediary that facilitates communication between workloads 103, and between workloads 103 and agent 104. For example, proxy 105 provides a token request from workload 103a to agent 104, which provides the token request to signing authority 106. In another example, proxy 105 provides a token from agent 104 (which receives the token from signing authority 106) to workload 103a. Proxy 105 provides enhanced security by acting as a firewall between workloads 103 and between workloads 103 and agent 104. This enhanced security prevents unauthorized access to workloads 103 and agent 104 on nodes 102. For example, if workload 103c is intercepted and/or corrupted by an attacker ("malicious workload 103") attempts to communicate with workload 103a via proxy 105, proxy 105 verifies whether the malicious workload 103c is authorized based on predefined security rules. If the malicious workload 103c is not authorized, proxy 105 blocks the communication attempt, thereby protecting workload 103a and maintaining the integrity of the operations of node 102a. For example, proxy 105 stores one or more access control lists (ACLs) in the form of an allowlist or a blocklist. If an IP address associated with a malicious workload 103c is not included in an allowlist or is included in a blocklist, execution of the malicious workload 103c is halted and/or the malicious workload 103c is removed (e.g., deleted from the system 100 or moved to a quarantine zone). In another example, proxy 105 blocks the communication attempt if the communication attempt is not encrypted (e.g., if the malicious workload 103c attempts to transmit data in plain text).

Signing authority 106 is a software service that issues (e.g., generates and provides) tokens (e.g., to workloads 103, agent 104, or cloud platform 107). Signing authority 106 issues (e.g., generates) tokens when it has an intermediate signing certificate. An intermediate signing certificate is a digital certificate establishing that tokens issued from signing authority 106 are valid. In examples, signing authority 106 receives the intermediate signing certificate from IAM service 108 in response to IAM service 108 verifying the identity of signing authority 106 and the health of node 102b, as described in FIG. 2.

Cloud platform 107 is a cloud computing environment that provides node cluster 101 access to resources of system 100. Cloud platform 107 is implemented in a cloud-based or server-based environment using one or more computing devices, such as server devices (e.g., web servers, file servers, application servers, database servers). Cloud platform 107 comprises one or more hardware and/or software components and is subject to one or more distributed computing models (e.g., Infrastructure as a Service (IaaS), Platform as a Service (PaaS), Software as a Service (SaaS), Functions as a Service (FaaS)). In examples, one or more node clusters 101 are deployed in edge infrastructure associated with cloud platform 107 and one or more node clusters 101 are deployed in a separate computing environment. In an instance, cloud platform 107 deploys a node cluster 101 to the computing environment of an end user (e.g., in the end user's home or office) or to a computing environment within cloud platform 107. Cloud platform 107 includes IAM service 108 and storage 109.

IAM service 108 is a cloud-based identity and access management software service that provides authentication and authorization capabilities. In examples, the authentication and authorization capabilities include providing access to centralized directory services, access control services, identity federation services, signing sign-on services, multifactor authentication services, and/or audit and compliance reporting services. Centralized directory services consolidate user data (e.g., names, email addresses, department details, employee IDs) into a single location (e.g., a centralized storage area that acts as a source of truth for user information). Access control services ensure that authorized individuals can access resources of a system, and that unauthorized individuals are unable to access the resources of the system. Identity federation services allow for secure sharing of identity information (e.g., usernames, passwords) across different systems and organizations. Single sign-on (SSO) services permit a single set of login credentials to access multiple applications. Multifactor authentication (MFA) services use multiple methods of verification (e.g., email codes, one-time passwords (OTPs), biometric verification, authenticator applications) before granting access to resources of a system. Audit and compliance reporting services provide tools (e.g., compliance monitoring software) for tracking and documenting access to sensitive information (e.g., financial records, health records, proprietary business information). In examples, IAM service 108 issues an intermediate signing certificate to signing authority 106. IAM 108 verifies the identity of signing authority 106 and verifies the health of node 102b before issuing the intermediate signing certificate to signing authority 106.

Storage 109 is a data storage software device or service that allows for storing and accessing (e.g., by workload 103a) information related to one or more node clusters 101 and/or cloud platform 107 (e.g., IAM service 108). In an example, storage 109 stores application logs, user-generated content, system metrics, and/or transaction records associated with workloads 103. Application logs store records of events (e.g., errors, access attempts, data transfers) that occur while executing or in furtherance of executing workloads 103. User-generated content includes various forms of content (e.g., images, text, audio, video) that are generated by or otherwise associated with a user while a user interacts with resources of a system. System metrics are quantitative measurements of the performance of workloads 103 (e.g., CPU usage, memory usage, bandwidth usage, execution time). Transaction records are details of transactions processed by workloads 103 (e.g., data queries, service requests, purchases). In some examples, storage 109 receives a token from workloads 103 as part of a request by workloads 103 to access information stored by storage 109. Storage 109 uses the token to determine whether workloads 103 are authorized to access requested information, as described further in FIG. 4.

Figure 2:
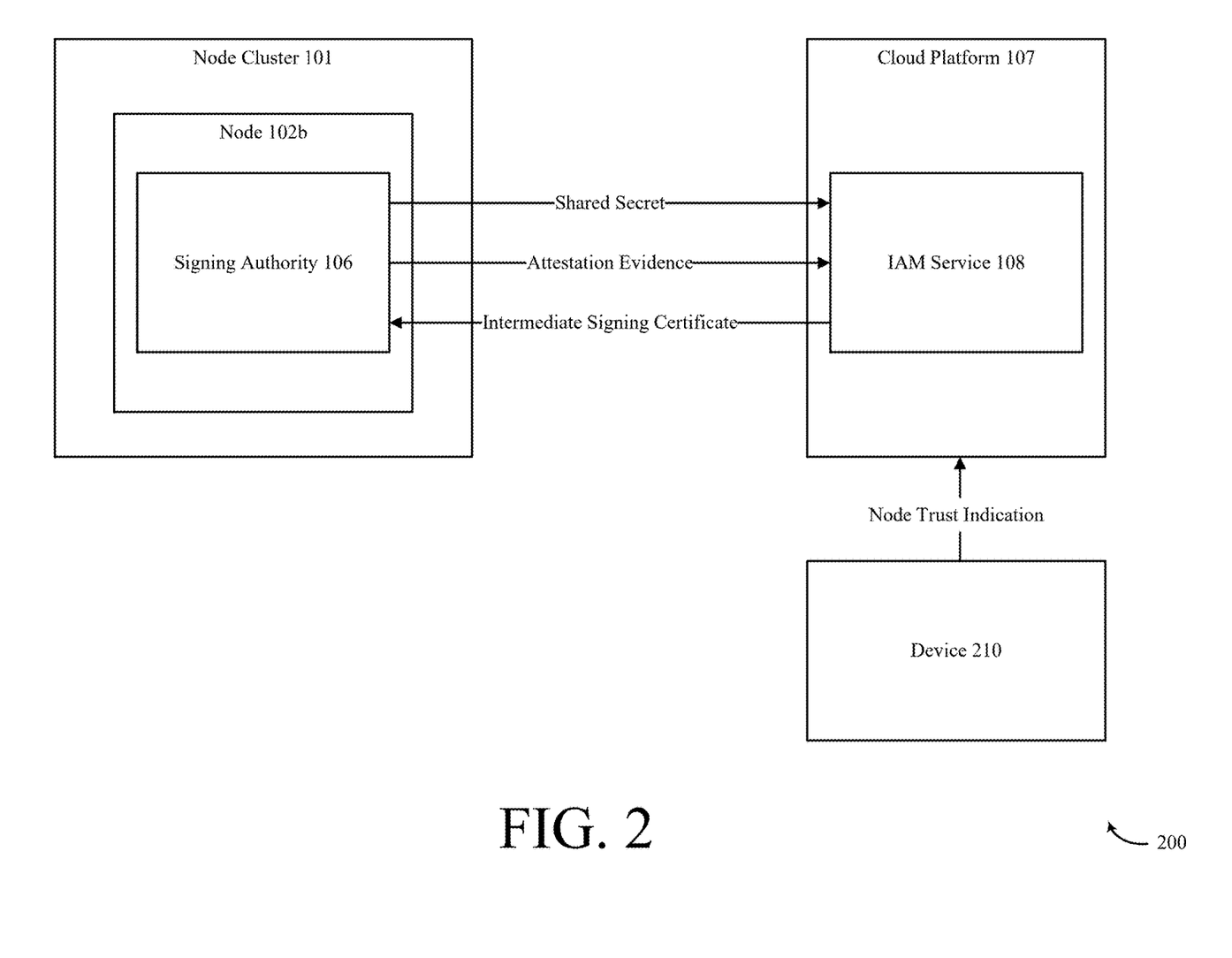
FIG. 2 illustrates an example system diagram for validating a signing authority in edge infrastructure in accordance with examples described herein.

FIG. 2 illustrates an example system 200 for validating a signing authority in edge infrastructure. In examples, system 200 is intended to, among other things, prevent attackers from cloning or spoofing a signing authority. Attackers that are able to successfully clone or spoof a signing authority are able to issue their own tokens and gain unauthorized access to resources of system 200. System 200 includes node cluster 101, node 102b, signing authority 106, cloud platform 107, IAM service 108, and device 210.

Device 210 is a physical machine used to indicate whether nodes 102 are trusted to run signing authority 106, among other uses. In an example, a user operating device 210 provides an indication to cloud platform 107 that node 102b is trusted to run signing authority 106. For instance, cloud platform 107 provides a user interface that enables a user to manage node cluster 101. A user indicates, via the user interface (e.g., by selecting an option provided on the user interface or by configuring settings using the interface), one or more nodes 102 that are trusted to run signing authority 106. In response to cloud platform 107 receiving an indication that a node 102 is trusted to run signing authority 106, IAM service 108 provides an intermediate signing certificate to signing authority 106. In some examples, IAM service 108 evaluates attestation evidence, as described below, as part of determining whether to provide the intermediate signing certificate to signing authority 106. Device 210 is an edge infrastructure device (e.g., edge device, data source) in some examples.

In some examples, IAM service 108 pre-designates that a node 102 (e.g., node 102b) is trusted to run signing authority 106. For example, as part of configuring node cluster 101 and/or nodes 102 (e.g., via an interface of cloud platform 107), a user designates a particular node 102 to be used to run signing authority 106. The designation of the particular node 102 occurs prior to other nodes 102 receiving an intermediate signing certificate from IAM 108 to run a signing authority. In pre-designating the node 102, IAM service 108 binds to the attestation key associated with the node 102 or to the root encryption key associated with node cluster 101. Binding IAM service 108 refers to cryptographically associating IAM service 108 with, for example, the node 102 using the attestation key or the node cluster 101 using the root encryption key. By pre-designating a specific node 102 as trusted to run signing authority 106, other nodes are prevented from becoming a signing authority 106. For example, other nodes (e.g., malicious or unauthorized nodes) in possession of shared secrets are unable to receive an intermediate signing certificate from IAM service 108, as IAM service 108 has already provided the intermediate signing certificate to node 102 and pre-designated the node 102 to run signing authority 106.

Signing authority 106 provides a shared secret to IAM service 108 in order to receive an intermediate signing certificate from IAM service 108, which enables signing authority 106 to issue tokens. A shared secret is data known only by the parties who share the shared secret (e.g., signing authority 106 and IAM service 108). The shared secret is a personal identification number (PIN), a password, a passphrase, an array of random or pseudo-random bytes, or the like. The shared secret is digitally signed using an attestation key to create a digital signature that authenticates the shared secret. An attestation key is a cryptographic element used for encrypting and decrypting data. A valid attestation key (e.g., verified by IAM service 108) indicates that the identity of signing authority 106 is verified (e.g., signing authority identified and/or trusted). In examples, the attestation key is stored in a trusted platform module (TPM) implemented by system 200. A TPM is a specialized computer chip that is designed to secure hardware with integrated cryptographic keys. In some examples, a TPM is implemented as a virtual TPM (vTPM), which is a software-based representation of a TPM. The vTPM stores information for authentication (e.g., the attestation key). In some examples, one or more nodes 102 implement a vTPM.

In examples, the attestation key is validated based on a chain of trust linked to a root encryption key. A root encryption key is a public/private key pair that is unique to node cluster 101 and that identifies a root certificate authority (CA). A root CA is a trusted third-party service that stores, signs, and issues a root certificate which includes the public root encryption key. The root certificate is self-signed by the private root encryption key, which is stored in a key storage management solution accessible to system 200. The private root encryption key is used to create attestation keys for one or more nodes 102. As the attestation key is trusted through the chain of trust to the root encryption key, signing the shared secret with the attestation key indicates that the identity of signing authority 106 is verified.

In some examples, signing authority 106 provides a claim to IAM service 108 to indicate where the attestation key of node 102b (corresponding to signing authority 106) is protected. For example, the claim indicates that the attestation key has been stored in a secure storage (e.g., a vTPM or a TPM) and/or the claim indicates a length of time the attestation key has been stored. In some examples, the claim indicates a security level of the secure storage that protected and/or stored the attestation key. For instance, an attestation key that is stored in a vTPM or TPM is assigned a "high" security level, whereas an attestation key that is stored as plain text is assigned a "low" security level. IAM service 108 considers the claim when determining whether to provide the intermediate signing certificate to signing authority 106. To further the example, if the attestation key has been stored in location that is considered to have a "high" security level, IAM service 108 determines that it is safe to provide the intermediate signing certificate to signing authority 106. However, if the attestation key has been stored in location that is considered to have a "medium" or "low" security level, IAM service 108 determines that it is not safe to provide the intermediate signing certificate to signing authority 106.

Signing authority 106 provides attestation evidence for node 102b to IAM service 108 to receive an intermediate signing certificate from IAM service 108, which enables signing authority 106 to issue tokens. Attestation evidence is information that indicates whether node 102b is healthy. In examples, a node 102b is considered healthy if node 102b is operating in a state to reliably execute workloads (e.g., workloads 103) and otherwise performing as expected without experiencing or causing issues that would impede the functionality or security of node cluster 101. Attestation evidence includes boot time attestation evidence and/or runtime attestation evidence. In an example, the attestation evidence includes a record of a boot sequence for node 102b, which has been verified by a trusted third-party attestation authority to ensure that node 102b was initiated using a secure boot process. A trusted third-party attestation authority is an entity that acts as an impartial facilitator, providing assurance that the attestation evidence collected by one party (e.g., node cluster 101 or cloud platform 107) is authentic and reliable. A secure boot process is a security feature that ensures that node 102b boots using software that is trusted by an original equipment manufacturer (OEM). In other examples, the attestation evidence also includes hardware configuration details for node 102b, such as CPU, memory, and storage configuration details. The hardware configuration details indicate whether the hardware of node 102b has been altered (e.g., changed from a baseline or expected configuration). The baseline or expected configuration represents a secure and trusted state that has been defined by system administrators or a security policy.

In other examples, the attestation evidence further includes software and/or firmware version information for node 102b, which has been verified by the trusted third-party attestation authority. The software and/or firmware version information is compared against known versions of software and/or firmware to ensure that unauthorized changes have not been made to software and/or firmware of node 102b. In a further example, attestation evidence includes security-related configuration settings for node 102b, including firewall rules and access controls. Verification, by the trusted third-party attestation authority, of such security-related configuration settings indicate whether the settings are in compliance with relevant security policies. The attestation evidence further includes an indication indicating whether a security component (e.g., a security service or device) implemented on or having access to node 102b is enabled and active. In examples, the security component protects data of node 102b from unauthorized access by encrypting a portion of system 200 (e.g., a drive or a partition) and requiring one or more factors of authentication to decrypt the encrypted portion. Determining that the security component is enabled and active indicates the data and operations of node 102b are secure (e.g., encrypted or unmodified). In some examples, the attestation evidence is stored in a vTPM on node 102b and signed with the private attestation key. Signing authority 106 provides the signed attestation evidence to IAM service 108.

In some examples, signing authority 106 provides the signed shared secret and/or the attestation evidence to IAM service 108 responsive to signing authority 106 being deployed on node 102b. For instance, cloud platform 107 deploys (e.g., installs) signing authority 106 on node 102b. Responsive to being installed on node 102b (e.g., as part of an installation or an initialization process), signing authority 106 provides the signed shared secret and/or attestation evidence to IAM service 108. In some other examples, prior to receiving the token request from the workload 103, signing authority 106 does not have an intermediate signing certificate or has an invalid (e.g., expired or unauthorized) intermediate signing certificate. In response to receiving the token request, signing authority 106 provides the signed shared secret and/or attestation evidence to IAM service 108. Signing authority 106 then receives an intermediate signing certificate from IAM service 108, which enables signing authority 106 to provide a token to satisfy the token request from the workload 103. In yet other examples, signing authority 106 provides the shared secret to IAM service 108 as a part of a renewal process for the intermediate signing certificate of signing authority 106. For instance, in response to the expiration of the intermediate signing certificate, signing authority 106 provides a new (e.g., current) signed shared secret and/or new (e.g., current) attestation evidence to IAM service 108. IAM service 108 then provides a new or renewed intermediate signing certificate to signing authority 106. Renewal occurs after a predefined time period (e.g., one week or one month) or in response to IAM service 108 or cloud platform 107 determining that some portion of system 100 (e.g., signing authority 106, node 102b, node cluster 101) is compromised.

IAM 108 uses the attestation key to evaluate the signature on the shared secret (e.g., to determine whether signing authority 106 is valid) and to evaluate the signature on the attestation evidence (e.g., to determine whether node 102b is healthy). To evaluate a signature, IAM service 108 uses the public key corresponding to the attestation key to verify the signature. This public key is obtained from an attestation certificate corresponding to the attestation key that is part of the chain of trust leading back to the root encryption key. In some examples, nodes 102 within node cluster 101 change (e.g., new nodes are added, other nodes are removed from node cluster 101). Each node 102 is associated with its own attestation key. IAM 108 is able to verify that signing authority 106 and/or node 102b are valid even when nodes 102 change (and thus the attestation keys change) within node cluster 101 by ensuring that attestation keys are chained to the root encryption key associated with node cluster 101. In some examples, IAM service 108 verifies the attestation certificate corresponding to the attestation key by evaluating the attestation certificate's validity period (e.g., the span of time during which the attestation certificate is valid) and/or ensuring the attestation certificate has not been revoked. Evaluating the attestation certificate's validity period includes examining the attestation certificate's validity dates to ensure that the current date falls within the start and end dates of the attestation certificate's validity period. Ensuring that the attestation certificate has not been revoked includes accessing a Certificate Revocation List (CRL) or using an Online Certificate Status Protocol (OCSP). A revoked attestation certificate is no longer valid, even if it is within its validity period.

IAM service 108 evaluates the attestation evidence to determine whether node 102b is healthy. Although typically the trusted-third party attestation authority verifies the attestation evidence and provides a report for IAM service 108 indicating whether node 102b is healthy, IAM service 108 independently evaluates one or more portions of the attestation evidence in some examples. In one example, IAM service 108 evaluates boot time attestation evidence and/or runtime attestation evidence. To evaluate boot time attestation evidence, IAM service 108 evaluates the record of the boot sequence for node 102b to ensure that node 102b was initiated using the secure boot process. For instance, IAM service 108 verifies digital signatures for each boot loader stage in the record. In other examples, IAM service 108 evaluates hardware configuration details indicating whether the hardware of node 102b has been altered (e.g., changed from a baseline or expected configuration). For instance, IAM service 108 verifies that the hardware of node 102b meets the predefined TPM version requirements. In another instance, IAM service 108 verifies that the hardware of node 102b continues to implement a previously configured memory access protection (e.g., direct memory access (DMA) protection). In other examples, IAM service 108 evaluates the software and/or firmware version information for node 102b. For instance, IAM service 108 compares the software and/or firmware version information for node 102b against known versions of software and/or firmware to ensure that unauthorized changes have not been made to the software and/or firmware of node 102b. In other examples, IAM service 108 evaluates security-related configuration settings (e.g., firewall rules and access controls), which indicate whether the settings are in compliance with relevant security policies. For instance, IAM service 108 evaluates firewall logs to determine whether firewall rules are being applied in accordance with security policies defined for system 100. In other examples, IAM service 108 evaluates whether a security component implemented on or having access to node 102b is enabled and active. For instance, IAM service 108 evaluates state data, configuration settings, and/or event logs for the security component to determine whether the security component is enables and active. Based on determining that node 102b is healthy, IAM service 108 issues an intermediate signing certificate to signing authority 106.

Figure 3:
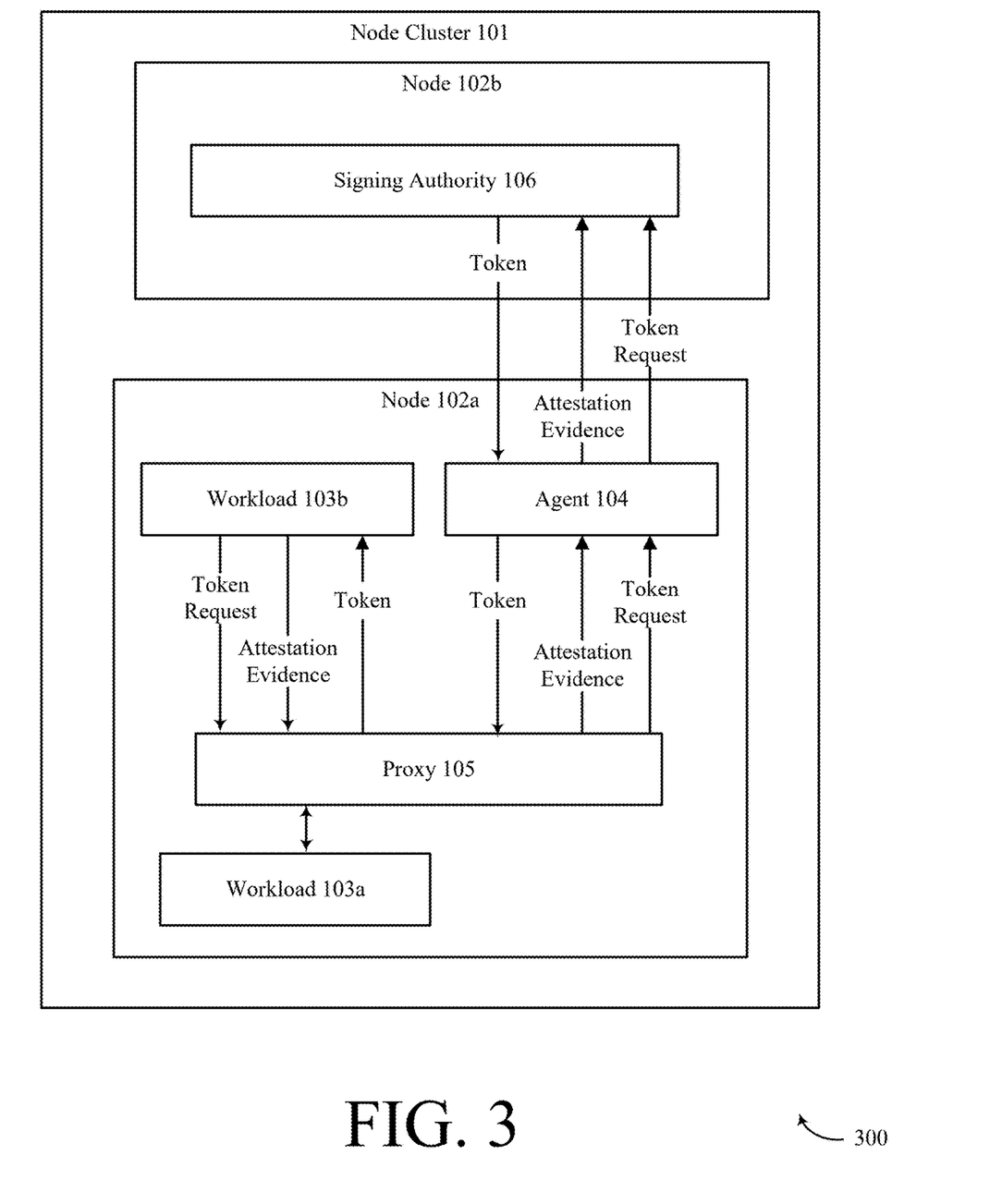
FIG. 3 illustrates an example system diagram for validating a workload and providing bound tokens in edge infrastructure in accordance with examples described herein.

FIG. 3 illustrates a system for validating a workload and providing bound tokens in edge infrastructure. In some examples, system 300 is intended to, among other things, prevent attackers from intercepting tokens from workloads. Attackers that are able to successfully intercept tokens transmitted to or from workloads are able to gain unauthorized access to resources of system 200. System 300 includes node cluster 101, node 102a, node 102b, workload 103a, agent 104, proxy 105, and signing authority 106.

Signing authority 106 receives, from workload 103a (e.g., via agent 104), a token request for a token. The token request is signed by an attestation key that is stored in a TPM implemented by system 300. Signing authority 106 evaluates the signature on the token request. To evaluate the signature, signing authority 106 uses the public key corresponding to the attestation key to verify the signature, as discussed with respect to IAM 108 in FIG. 2. Signing authority 106 is able to verify that workload 103a and/or node 102a are valid even when nodes 102 change (and thus the attestation keys change) within node cluster 101 by ensuring that attestation keys are chained to the root encryption key associated with node cluster 101, as discussed with respect to IAM 108 in FIG. 2. In some examples, signing authority 106 provides a token to workload 103a (e.g., via agent 104 and proxy 105) if the signature is verified.

Signing authority 106 receives, from workload 103a (e.g., via agent 104), attestation evidence indicating whether node 102a is healthy. In some examples, workload 103a signs the attestation evidence with an attestation key corresponding to node 102a. Signing authority 106 evaluates the attestation evidence to determine whether node 102a is healthy. For instance, signing authority 106 evaluates boot time attestation evidence and/or runtime attestation evidence, as discussed with respect to IAM 108 in FIG. 2. Although typically the trusted-third party attestation authority verifies the attestation evidence and provides a report for signing authority 106 indicating whether node 102a is healthy, signing authority 106 independently evaluates one or more portions of the attestation evidence in some examples. If the attestation evidence indicates that node 102a is healthy, signing authority 106 provides a token to workload 103a (e.g., via agent 104 and proxy 105).

In some examples, workload 103a provides a claim to signing authority 106 to indicate protection information associated with the attestation key of node 102a (corresponding to workload 103a). For example, the claim indicates whether the attestation key has been stored in a secure storage, the length of time the attestation key has been stored, or a security level of the secure storage that protected and/or stored the attestation key, as discussed with respect to IAM 108 in FIG. 2.

To prevent tokens from being modified or duplicated by attackers, signing authority 106 binds issued tokens to the edge infrastructure associated with the provider of the token request. Binding a token refers to cryptographically associating the token with a particular entity. For example, binding the token comprises signing the token with the attestation key (e.g., the public attestation key). The provider of the token request refers to workload 103a, node 102a, and/or node cluster 101. For example, signing authority 106 binds tokens to the attestation key of node 102a, the vTPM of node 102a, or to the root encryption key (e.g., public key, private key, or root certificate) of node cluster 101. In some cases, binding the tokens ensures that the tokens are only usable in node cluster 101, as the root encryption key is unique to node cluster 101. The root encryption key is trusted, which results in the attestation key being trusted through a chain of trust. Signing authority 106 provides bound tokens to workload 103a. In some examples, signing authority 106 includes a demonstrated proof of possession with the bound tokens to prove the tokens are bound to the edge infrastructure. The demonstrated proof of possession includes a signature resulting from signing the bound token with the attestation key (e.g., public attestation key).

Figure 4:
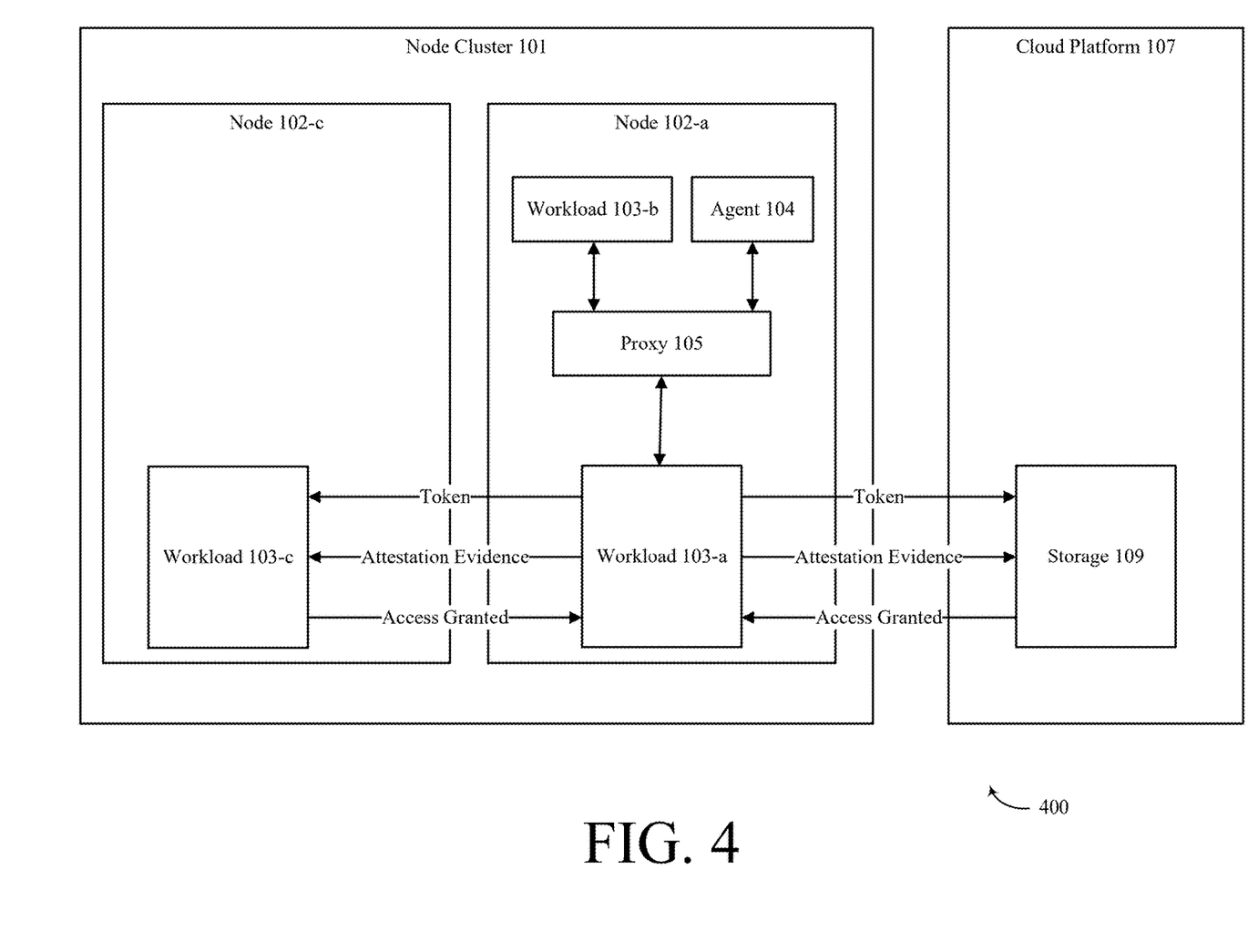
FIG. 4 illustrates an example system diagram for validating a workload in edge infrastructure in accordance with examples described herein.

FIG. 4 illustrates a system for validating a workload in edge infrastructure. In some examples, system 400 is intended to, among other things, prevent malicious workloads 103 from gaining access to resources of system 400. System 400 includes node cluster 101, node 102a, node 102c, workload 103a, workload 103b, workload 103c, agent 104, proxy 105, cloud platform 107, and storage 109.

In some examples, workload 103a attempts to access a resource of system 400 (e.g., workload 103b, workload 103c, storage 109). As part of the attempt, workload 103a provides a bound token to the resource (e.g., directly to the resource or via proxy 105). The resource verifies the identity of workload 103a by verifying that workload 103a is the entity to which the bound token was issued. For example, the resource verifies the demonstrated proof of possession associated with the bound token, which proves that the bound token is bound at least to edge infrastructure associated with workload 103a (e.g., the attestation key of node 102a, the vTPM of node 102a, the root encryption key of node cluster 101). In some examples, when the bound token is bound to the attestation key of node 102a, the resource is able to verify that the attestation key that the token is bound to is the same as the attestation key corresponding to node 102a (the node 102 presenting the token to the resource). For example, the resource uses an attestation key to verify the signature on the bound token and compare that attestation key to the attestation key corresponding to node 102a, which is identified by the resource through a handshake between the resource and node 102a. The resource is able to verify that workload 103a and/or node 102a are valid even when nodes 102 change (and thus the attestation keys change) within node cluster 101 by ensuring that attestation keys are chained to the root encryption key associated with node cluster 101, as discussed with respect to IAM 108 in FIG. 2. In some examples, the resource grants workload 103a access if the bound token is verified.

Workload 103a provides attestation evidence to the resource (e.g., directly to the resource or via proxy 105) when attempting to use a token to access the resource. In some examples, workload 103a signs the attestation evidence with the attestation key and provides the signed attestation evidence to the resource. The resource evaluates the signature on the attestation evidence as discussed with respect to IAM 108 in FIG. 2. The resource evaluates the attestation evidence to determine whether node 102a is healthy. For instance, the resource evaluates boot time attestation evidence and/or runtime attestation evidence, as discussed with respect to IAM 108 in FIG. 2. Although typically the trusted-third party attestation authority verifies the attestation evidence and provides a report for IAM service 108, signing authority 106, node 102a, or workload 103a indicating whether node 102a is healthy, cloud platform 107 or node cluster 101 (on behalf of node 102a or workload 103a), node 102a, or workload 103a independently evaluates one or more portions of the attestation evidence in some examples. In some examples, the resource grants workload 103a access if the attestation evidence is verified.

In some examples, workload 103a provides a claim to the resource (e.g., directly to the resource or via proxy 105) to indicate protection information associated with the attestation key of node 102a (corresponding to workload 103a). For example, the claim indicates whether the attestation key has been stored in a secure storage, the length of time the attestation key has been stored, or a security level of the secure storage that protected and/or stored the attestation key, as discussed with respect to IAM 108 in FIG. 2. In some examples, the resource grants workload 103a access (e.g., directly to workload 103a or via proxy 105) based on the protection information associated with the attestation key.

Figure 5:
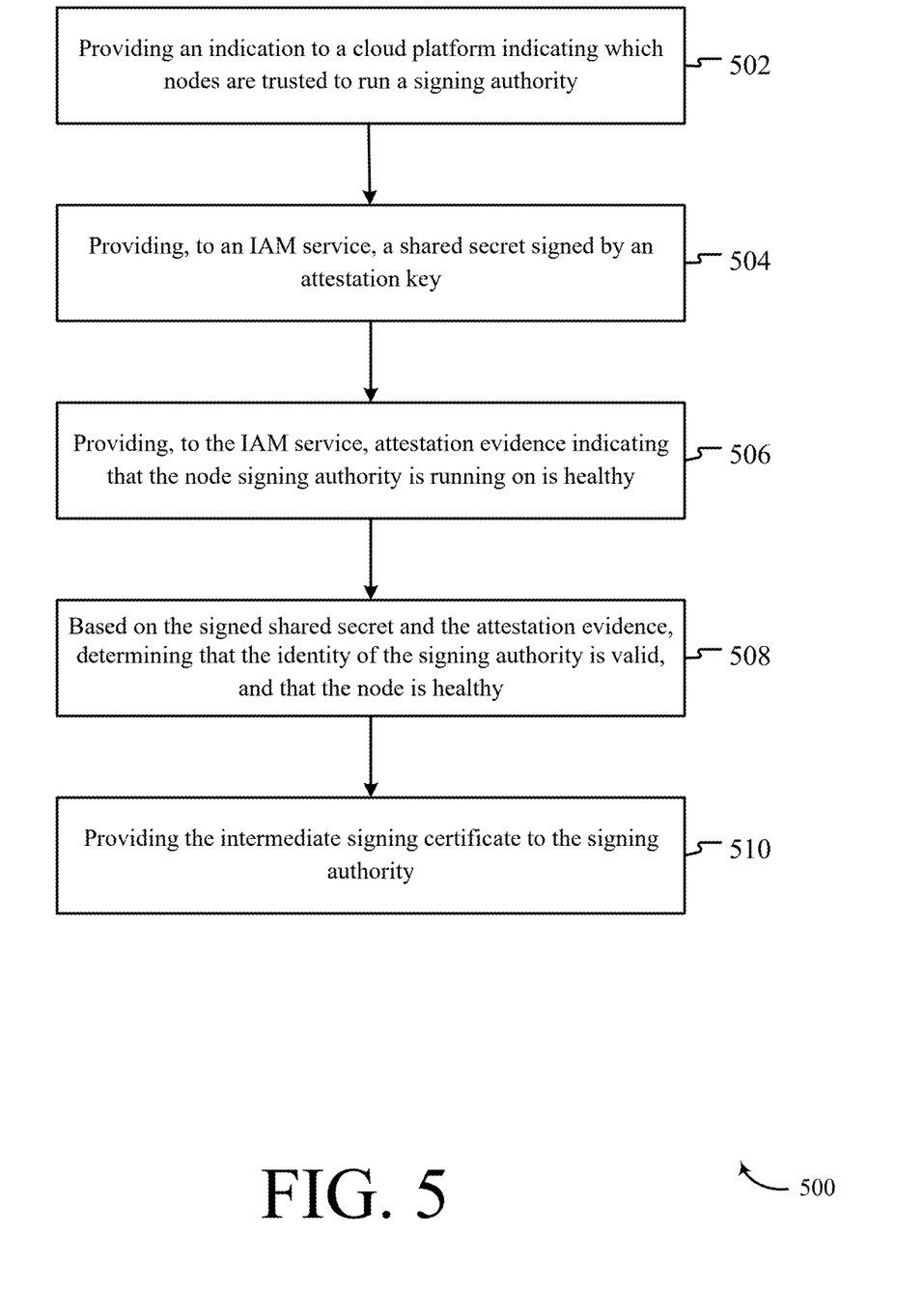
FIG. 5 illustrates a method flow for validating a signing authority in edge infrastructure in accordance with examples described herein.

FIG. 5 illustrates an example method for validating a signing authority in edge infrastructure. The method 500 is performed by the systems described herein and/or the components of such systems. For instance, the method 500 is performed by components of node cluster 101 and/or components of cloud platform 107 of FIG. 1.

At operation 502, device 210 provides an indication to cloud platform 107 indicating a node 102 that is trusted to run signing authority 106. For instance, cloud platform 107 provides a user interface that enables a user of device 210 to manage node cluster 101. The user indicates via the user interface (e.g., by selecting an option provided on the user interface or by configuring settings using the interface) a node 102 that is trusted to run signing authority 106.

At operation 504, signing authority 106 provides, to IAM service 108, a shared secret signed by an attestation key. The attestation key indicates that the identity of signing authority 106 is verified. In examples, the attestation key is stored in a TPM or a vTPM of the node 102. The attestation key is validated based on a chain of trust linked to a root encryption key.

At operation 506, signing authority 106 provides, to IAM service 108, attestation evidence indicating that the node 102 (e.g., the node on which signing authority 106 is running) is healthy. Signing authority 106 signs the attestation evidence using an attestation key in some examples. Attestation evidence includes boot time attestation evidence and/or runtime attestation evidence. For example, the attestation evidence includes a record of a boot sequence for the node 102, hardware configuration details for node 102, software and/or firmware version information for the node 102, security-related configuration settings for the node 102, or an indication of whether a security component implemented on or having access to the node 102 is enabled and active.

At operation 508, based on the signed shared secret and the attestation evidence, IAM service 108 determines the identity of signing authority 106 is valid and the node 102 is healthy. In examples, determining the identity of signing authority 106 comprises evaluating the signature on the signed shared secret and/or evaluating the signature on the attestation evidence, as discussed with respect IAM 108 in FIG. 2. In some examples, determining the health of the node that signing authority 106 is running on (node 102b) includes evaluating the attestation evidence and/or evaluating the signature on the attestation evidence, as discussed with respect to IAM 108 in FIG. 2.

At operation 510, IAM service 108 provides an intermediate signing certificate to signing authority 106. For example, in response to determining the identity of signing authority 106 is valid and the node 102 is healthy, IAM service 108 provides an intermediate signing certificate that enables signing authority 106 to issue tokens to workloads 103 and other resources accessible to node cluster 101 and cloud platform 107. Signing authority 106 stores the intermediate signing certificate and issue tokens in accordance with the intermediate signing certificate until the intermediate signing certificate is no longer valid (e.g., is expired or revoked).

Figure 6:
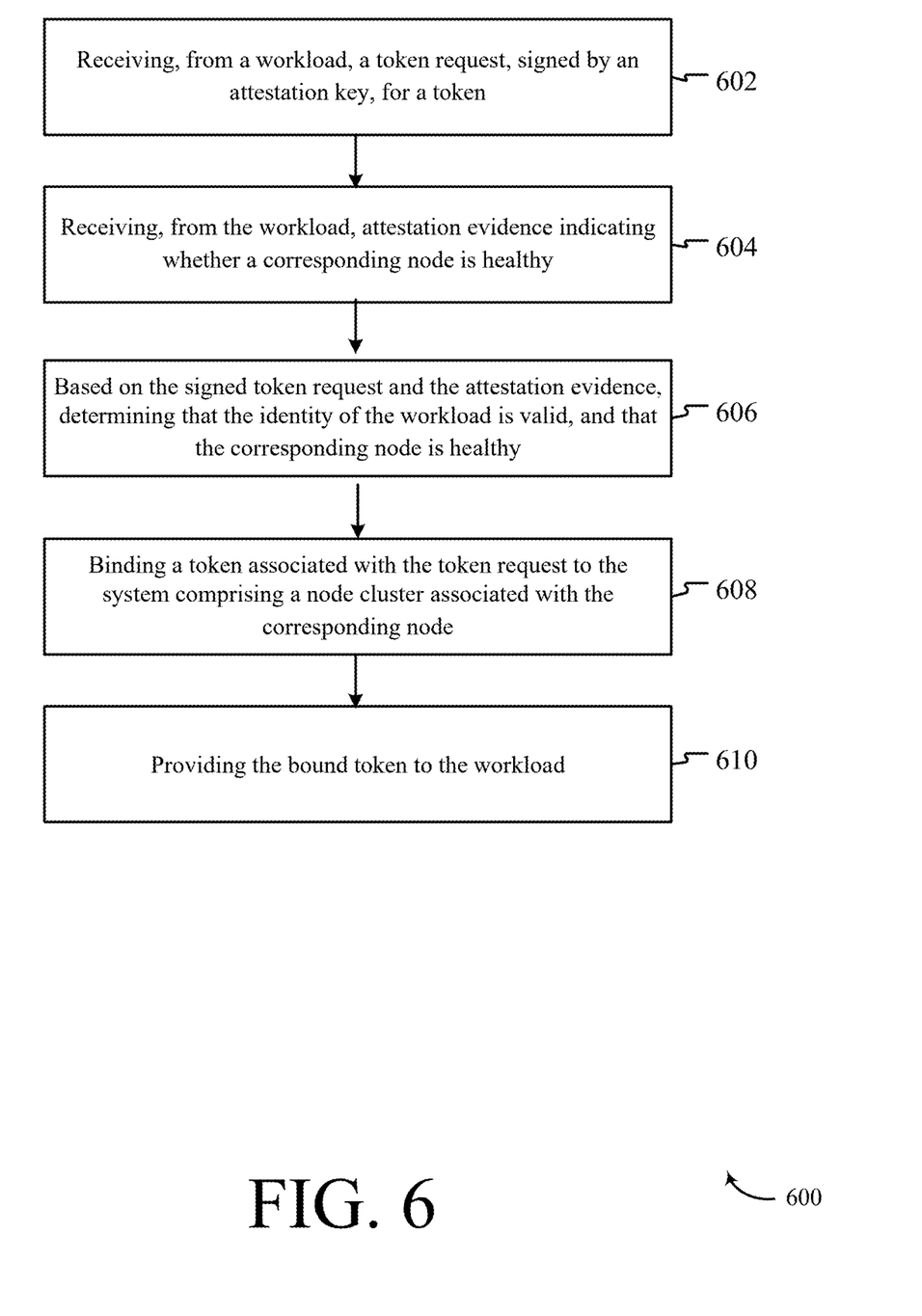
FIG. 6 illustrates a method flow for validating a workload and providing bound tokens in edge infrastructure in accordance with examples described herein.

FIG. 6 illustrates an example method for validating a workload and providing bound tokens in edge infrastructure. The systems described herein and/or the components of such systems perform the method 600. For instance, the method 600 is performed by components of node cluster 101 of FIG. 1.

At operation 602, signing authority 106 receives, from a workload 103 (e.g., via agent 104 and proxy 105), a token request for a token. In examples, the token request is signed by an attestation key indicating that the identity of the node 102 on which the workload 103 is running is verified. In examples, the attestation key is stored in a TPM or a vTPM implemented by the system comprising node cluster 101. The attestation key is validated based on a chain of trust linked to a root encryption key. In some examples, signing authority 106 verifies the signature on the token request using an attestation key.

At operation 604, signing authority 106 receives, from workload 103 (e.g., via agent 104 and proxy 105), attestation evidence indicating whether the corresponding node 102 (e.g., the node 102 that the workload 103 is running on) is healthy. Attestation evidence includes boot time attestation evidence and/or runtime attestation evidence, as discussed in operation 506 of FIG. 5.

At operation 606, based on the signed token request and the attestation evidence, signing authority 106 determines the identity of the workload 103 is valid and the corresponding node 102 is healthy. Based on these determinations, signing authority 106 further determines it is safe to issue tokens to workload 103. In examples, determining the identity of the workload 103 comprises evaluating the signature on the token request and/or evaluating the signature on the attestation evidence, as discussed with respect to signing authority 106 in FIG. 3. In some examples, determining the health of the node that the workload 103 is running on includes evaluating the attestation evidence and/or evaluating the signature on the attestation evidence, as discussed with respect to signing authority 106 in FIG. 3.

At operation 608, signing authority 106 binds a token associated with the token request to the system comprising node cluster 101 associated with the corresponding node. For example, signing authority 106 binds the token to the attestation key of node 102a, the vTPM of node 102a, and/or to the root encryption key of an edge infrastructure comprising node cluster 101. In some examples, binding the token ensures that the token is (e.g., only) usable in node cluster 101, as the root encryption key is unique to node cluster 101. The root encryption key is trusted, which causes the attestation key to be trusted through a chain of trust. When the token is bound to the attestation key of node 102a, recipients of the token are able to verify that the attestation key that the token is bound to is the same as the attestation key corresponding to node 102a (the node 102 presenting the token), as described in FIG. 4.

At operation 610, signing authority 106 provides the bound token to the workload 103. In some examples, signing authority 106 includes a demonstrated proof of possession with the bound token to prove that the bound token has been bound to the system comprising node cluster 101. The demonstrated proof of possession includes a signature resulting from signing authority 106 signing the bound token with an attestation key (e.g., public attestation key).

Figure 7:
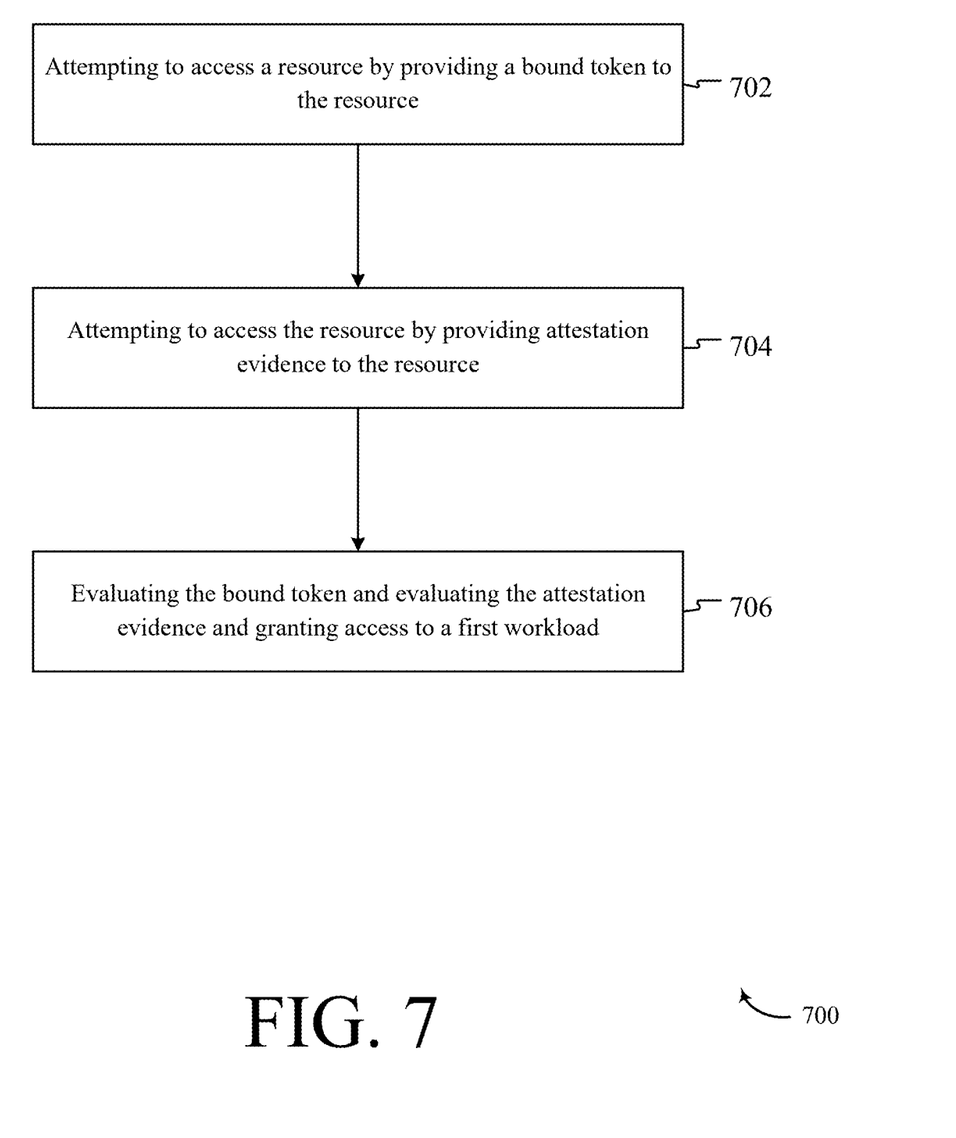
FIG. 7 illustrates a method flow for validating a workload in edge infrastructure in accordance with examples described herein.

FIG. 7 illustrates an example method for validating a workload in edge infrastructure. The systems described herein and/or the components of such systems perform the method 700. For instance, the method 700 is performed by components of node cluster 101 and/or components of cloud platform 107 of FIG. 1.

At operation 702, a workload 103 (e.g., workload 103a) executing on a node 102 (e.g., node 102a) attempts to access a resource (e.g., of hybrid infrastructure) (e.g., workload 103b, workload 103c, storage 109). As part of the access attempt, the workload 103 provides a bound token to the resource. The bound token includes a demonstrated proof of possession proving that the bound token is bound at least to edge infrastructure associated with the workload 103 (e.g., the vTPM of the node 102 or the root encryption key of node cluster 101).

At operation 704, workload 103 attempts to access the resource by providing attestation evidence to the resource. In some examples, the workload 103 signs the attestation evidence with an attestation key and provides the signed attestation evidence to the resource. Attestation evidence includes boot time attestation evidence and/or runtime attestation evidence for the node 102 of the workload 103, as discussed in operation 506 of FIG. 5.

At operation 706, the resource evaluates the bound token and evaluates the attestation evidence. The resource evaluates the bound token by verifying that the workload 103 is the entity that the bound token was issued to. For example, the resource verifies the demonstrated proof of possession associated with the bound token which proves that the bound token is bound at least to edge infrastructure associated with the workload 103. Evaluating the attestation evidence comprises evaluating boot time attestation evidence and/or runtime attestation evidence, as discussed with respect to IAM 108 in FIG. 2. The resource evaluates the attestation evidence to determine whether node 102 is healthy. If the resource successfully verifies the bound token, and thus the identity of the workload 103, and determines that node 102 is healthy (based on the attestation evidence), the resource grants access to workload 103.

Figure 8:
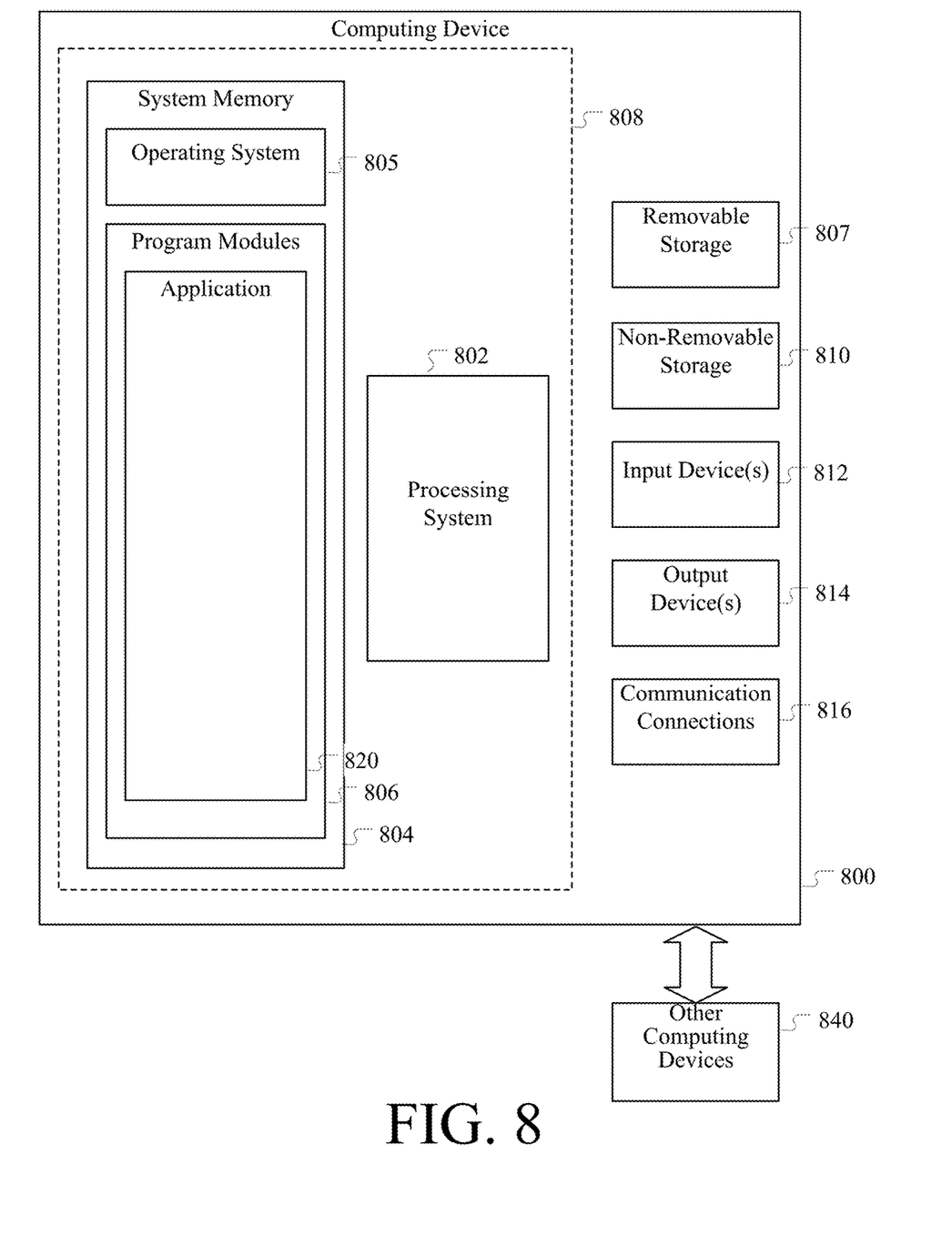
FIG. 8 illustrates a block diagram including physical components of a computing device in accordance with examples described herein.

FIG. 8 is a block diagram illustrating physical components (e.g., hardware) of a computing device 800 with which aspects of the disclosure may be practiced. The computing device components described below are suitable for the computing devices and systems described above. In a basic configuration, the computing device 800 includes at least one processing system 802 comprising processing unit(s) and a system memory 804. Depending on the configuration and type of computing device, the system memory 804 comprises volatile storage (e.g., random access memory (RAM)), non-volatile storage (e.g., read-only memory (ROM)), flash memory, or any combination of such memories.

The system memory 804 includes an operating system 805 and one or more program modules 806 suitable for running software application 820, such as one or more components supported by the systems described herein. The operating system 805, for example, is suitable for controlling the operation of the computing device 800.

Furthermore, embodiments of the disclosure are practiced in conjunction with a graphics library, other operating systems, or any other application program and is not limited to any particular application or system. This basic configuration is illustrated in FIG. 8 by those components within a dashed line 808. The computing device 800 has additional features or functionality. For example, the computing device 800 also includes additional data storage devices (removable and/or non-removable) such as, for example, magnetic disks, or optical disks. Such additional storage is illustrated in FIG. 8 by a removable storage device 807 and a non-removable storage device 810.

As stated above, a number of program modules and data files are stored in the system memory 804. While executing on the processing unit 802, the program modules 806 (e.g., application 820) perform processes comprising the aspects, as described herein. Other program modules used in accordance with aspects of the present disclosure include electronic mail and contacts applications, word processing applications, spreadsheet applications, database applications, slide presentation applications, drawing or computer-aided application programs, etc.

Furthermore, embodiments of the disclosure are practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure are practiced via a system-on-a-chip (SOC) where each or many of the components illustrated in FIG. 8 are integrated onto a single integrated circuit. Such an SOC device includes one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols are operated via application-specific logic integrated with other components of the computing device 800 on the single integrated circuit (chip). Embodiments of the disclosure are also practiced using other technologies capable of performing logical operations such as, for example, AND, OR, and NOT, comprising mechanical, optical, fluidic, and quantum technologies. In addition, embodiments of the disclosure may be practiced within a general-purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 840. Examples of suitable communication connections 816 include radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 807, and the non-removable storage device 810 are all computer storage media examples (e.g., memory storage). Computer storage media may include RAM, ROM, electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

In some examples, the present disclosure includes a system comprising: a processor; and memory comprising executable instructions that when executed, perform operations comprising: providing, from a signing authority running on a node and to an IAM service running on a cloud platform, a shared secret signed by an attestation key, wherein the attestation key is associated with a root encryption key, and wherein the attestation key indicates an identity of the signing authority is verified; providing, from the signing authority and to the IAM service, attestation evidence indicating the node is healthy; and receiving, from the IAM service, an intermediate signing certificate based on the shared secret and the attestation evidence.

In some examples, the operations further comprise receiving, at the IAM service, an indication of at least one node that is allowed to run the signing authority.

In some examples, the operations further comprise renewing the intermediate signing certificate based on new attestation evidence.

In some examples, the operations further comprise pre-designating, by the IAM service, that the node is trusted to run the signing authority.

In some examples, the attestation evidence is verified by a trusted third-party authority. In some examples, the attestation key is stored by a vTPM.

In some examples, the root encryption key is unique to a node cluster that includes the node, and wherein the identity of the signing authority is verified based on a chain of trust linking the attestation key to the root encryption key.

In some examples, the operations further comprise providing, from the signing authority and to the IAM service, a claim indicating where the attestation key is protected.

In some examples, the claim indicates that the attestation key is protected in a TPM or a vTPM.

In some examples, the present disclosure includes a system comprising: a processor; and memory comprising executable instructions that when executed, perform operations comprising: receiving, by a signing authority and from a workload running on a node, a token request, wherein the token request is signed by an attestation key associated with a root encryption key and indicates that an identity of the node is verified; receiving, by the signing authority and from the node, attestation evidence indicating that the node is healthy; binding, by the signing authority, a token to edge infrastructure associated with the workload based on the token request and the attestation evidence; and providing, by the signing authority, the token to the workload.

In some examples, binding the token to the edge infrastructure comprises binding the token to the root encryption key or a vTPM of the workload, the root encryption key being associated with a node cluster that includes the node.

In some examples, binding the token to the edge infrastructure comprises signing the token with the attestation key, the attestation key being associated with a root encryption key.

In some examples, the token grants the workload access to a resource.

In some examples, the operations further comprise receiving a claim that the attestation key is protected in a vTPM.

In some examples, the attestation evidence is verified by a trusted third-party attestation authority.

In some examples, the present disclosure includes a system comprising: a processor; and memory comprising executable instructions that when executed, perform operations comprising: receiving, by a first workload running or a storage and from a second workload running on a node, a bound token and attestation evidence, the bound token indicating that an identity of the second workload is verified, the attestation evidence indicating the node is healthy; and granting the second workload access to the first workload or the storage based on the identity of the second workload being verified and the node being healthy.

In some examples, the storage is hosted on a cloud platform.

In some examples, the operations further comprise the storage is hosted on a cloud platform.

In some examples, the first workload and the second workload are running on different nodes in a node cluster.

In some examples, the attestation evidence is verified by a trusted third-party attestation authority.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processor; and
memory comprising executable instructions that when executed, perform operations comprising:
providing, from a signing authority running on a node and to an identity and access management (IAM) service running on a cloud platform, a shared secret signed by an attestation key, wherein the attestation key is associated with a root encryption key, and wherein the attestation key indicates an identity of the signing authority is verified;
providing, from the signing authority and to the IAM service, attestation evidence indicating the node is healthy; and
receiving, from the IAM service, an intermediate signing certificate based on the shared secret and the attestation evidence.

2. The system of claim 1, the operations further comprising:
receiving, at the IAM service, an indication of at least one node that is allowed to run the signing authority.

3. The system of claim 1, the operations further comprising:
renewing the intermediate signing certificate based on new attestation evidence.

4. The system of claim 1, the operations further comprising:
pre-designating, by the IAM service, that the node is trusted to run the signing authority.

5. The system of claim 1, wherein the attestation evidence is verified by a trusted third-party authority.

6. The system of claim 1, wherein the attestation key is stored by a virtual trusted platform module (vTPM).

7. The system of claim 1, wherein the root encryption key is unique to a node cluster that includes the node, and wherein the identity of the signing authority is verified based on a chain of trust linking the attestation key to the root encryption key.

8. The system of claim 1, the operations further comprising:
providing, from the signing authority and to the IAM service, a claim indicating where the attestation key is protected.

9. The system of claim 8, wherein the claim indicates that the attestation key is protected in a trusted platform module (TPM) or a virtual TPM (vTPM).

10. A system comprising:
a processor; and
memory comprising executable instructions that when executed, perform operations comprising:
receiving, by a signing authority and from a workload running on a node, a token request, wherein the token request is signed by an attestation key associated with a root encryption key and indicates that an identity of the node is verified;
receiving, by the signing authority and from the node, attestation evidence indicating that the node is healthy;
binding, by the signing authority, a token to edge infrastructure associated with the workload based on the token request and the attestation evidence; and
providing, by the signing authority, the token to the workload.

11. The system of claim 10, wherein binding the token to the edge infrastructure comprises binding the token to the root encryption key or a virtual trusted platform module (vTPM) of the workload, the root encryption key being associated with a node cluster that includes the node.

12. The system of claim 10, wherein binding the token to the edge infrastructure comprises signing the token with the attestation key, the attestation key being associated with a root encryption key.

13. The system of claim 10, wherein the token grants the workload access to a resource.

14. The system of claim 10, the operations further comprising:
receiving a claim that the attestation key is protected in a virtual trusted platform module (vTPM).

15. The system of claim 10, wherein the attestation evidence is verified by a trusted third-party attestation authority.

16. A system, comprising:
a processor; and
memory comprising executable instructions that when executed, perform operations comprising:
receiving, by a first workload running or a storage and from a second workload running on a node, a bound token and attestation evidence, the bound token indicating that an identity of the second workload is verified, the attestation evidence indicating the node is healthy; and
granting the second workload access to the first workload or the storage based on the identity of the second workload being verified and the node being healthy.

17. The system of claim 16, wherein the storage is hosted on a cloud platform.

18. The system of claim 16, the operations further comprising:
verifying the identity of the first workload by verifying that the bound token is associated with an attestation key corresponding to the node.

19. The system of claim 16, wherein the first workload and the second workload are running on different nodes in a node cluster.

20. The system of claim 16, wherein the attestation evidence is verified by a trusted third-party attestation authority.

* * * * *